United States Patent [19]

Grindstaff et al.

[11] 4,120,989

[45] Oct. 17, 1978

[54] HIGH PROTEIN PASTA FORMULATION

[75] Inventors: Donald A. Grindstaff, Rochester, Minn.; John R. Eterno, Lemont, Ill.

[73] Assignee: Stauffer Chemical Company, Westport, Conn.

[21] Appl. No.: 737,311

[22] Filed: Nov. 1, 1976

[51] Int. Cl.$^2$ .............................................. A23L 1/16
[52] U.S. Cl. ..................................... 426/577; 426/451
[58] Field of Search .............. 426/557, 451, 657, 653, 426/654

[56] References Cited

U.S. PATENT DOCUMENTS

| | | | |
|---|---|---|---|
| 3,113,869 | 12/1963 | Lee | 426/557 |
| 3,875,315 | 4/1975 | Moneymaker | 426/549 |
| 3,920,857 | 11/1975 | Barker | 426/583 |
| 3,943,264 | 3/1976 | Davis | 426/583 |
| 3,949,101 | 4/1976 | Murthy | 426/557 |

*Primary Examiner*—Jeanette M. Hunter
*Attorney, Agent, or Firm*—Paul J. Juettner

[57] ABSTRACT

A high protein pasta which does not crack or craze upon drying or storage is prepared using a blend of from about 80% to about 95% flour, preferably semolina, and from about 20% to about 5% of a whey protein concentrate wherein at least 60% of the protein is denaturated which concentrate contains from about 1% to about 10% by weight of a food grade emulsifier, the latter percentage being based on the weight of the whey protein concentrate and the emulsifier.

13 Claims, No Drawings

HIGH PROTEIN PASTA FORMULATION

BACKGROUND OF THE INVENTION

The present invention relates to an improved high protein pasta formulation which when formed into a pasta shape, does not crack or craze upon drying and storage.

Pasta formulations are widely utilized as a food product throughout the world, with these products normally being in the form of spaghetti, macaroni, noodles, or the like. Normally, pasta formulations are prepared by forming a paste of flour and water, occasionally mixed with eggs, with the paste being extruded under conditions of high pressure into a product having the desired final shape and configuration. The flour ordinarily used is semolina, normally prepared as the coarse fraction of durum wheat, and widely available commercially.

Pasta formulations which consist essentially of semolina are frequently low in protein efficiency ratios (PER). The protein efficiency ratio of normal semolina is generally in the range of about 0.75–0.8.

High protein pasta formulations have been disclosed in U.S. Pat. No. 3,949,101, issued Apr. 6, 1976. This patent discloses a high protein pasta formulation utilizing a blend of from about 84% up to about 95% of semolina with the balance being undenatured modified whey solids. The modified whey solids are taught to contain about 50% whey protein. By the use of these compositions, the protein efficiency ratio of normal pasta can be increased from below 1 to a value greater than 2.4. It is taught that the protein enriched pasta is more easily extruded into its final form, retains its light yellow or golden color and has a good nonsticky eating quality after drying for 34 hours.

Denatured whey protein has also been used in pasta. The U.S.D.A. in Philadelphia has avocated such usage for denatured whey protein.

However, the protein enriched pasta product of U.S. Pat. No. 3,949,101 requires 34 hours at 38° C. (100° F.) to dry. In attempting to shorten the drying time to within the commercial range of four to six hours, it was found that the pasta cracked or produced crazing on the exterior of the pasta during drying and storage. The use of denatured whey proteins in place of the undenatured whey proteins shortened the drying time somewhat but did not overcome the problem.

Since long drying times are uneconomical and since cracked or crazed pasta is not marketable, it is necessary to provide a protein enriched pasta formulation which can be dried in a period of time shorter than the time presently required to dry protein enriched pasta without cracking or crazing during drying and storage.

BRIEF DESCRIPTION OF THE PRESENT INVENTION

In accordance with the present invention, it has been found that the cracking or crazing of high protein enriched pasta can be substantially reduced by using, as an enrichment concentrate and a food grade emulsifier. With this combination, a protein enriched pasta is obtained which does not crack or craze upon extrusion, drying and storage and which maintains the other desirable characteristics needed to commercialize the pasta.

DETAILED DESCRIPTION OF THE PRESENT INVENTION

The whey protein concentrate used in the present invention can be any whey protein product wherein the percentage of protein in the product is greater than the percentage in the solids of raw whey. Preferably, the whey protein content of the concentrate ranges from about 40 to about 60% with the remainder being lactose and ash. The concentrate can be derived from any cheese whey source, either acid cheese whey such as cottage cheese whey or sweet cheese whey as cheddar cheese whey, swiss cheese whey, mozzarella cheese whey and the like as well as mixtures thereof. Such concentrates can be made by a number of processes including: delactosing of whey; electrodialysis (e.g., procedure as described by Stribley, R.C., Food Processing, Vol. 24, No. 1, p. 49, 1963); by reverse osmosis; by ultrafiltration (e.g., as described by Horton B.S. et al., Food Technology, Vol. 26, p. 30, 1972); alcohol precipitation (e.g., Morr et al., J. Dairy Science, Vol. 53, p. 1162, 1970); or by gel filtration (e.g., Reissue Patent 27,806). Preferably, the whey protein concentrate is prepared by ultrafiltration, preferably, of neutralized cottage cheese whey. This product comprises 40–80% protein (N × 6.38), 10–30% lactose, 3–15% ash, and 0.5–4% fat. This product is available commercially under the name ENRPRO ® and the designation "made from grade A milk" from Stauffer Chemical Company, Food Ingredients Division, Westport, Conn.

Sweet (cheddar) and blends of acid (cottage) and sweet (cheddar) wheys can also be used in addition to acid whey to form the whey protein concentrate by the ultrafiltration concentration process. Of these, the acid whey is the more preferred whey protein source.

In accordance with the invention, at least 60% and preferably at least 70% of the whey protein content of the concentrate must be denatured. Denaturation can be accomplished by any known method though the use of heat is preferred. As illustrative of such method, a slurry of whey protein concentrate can be heated to a temperature above 60° C. and below 99° C. with constant agitation to insure uniform heat distribution for a period of time sufficient to denature at least 60% and preferably at least 70% of the protein but insufficient to form a curd. Effective denaturation can be achieved by heating a slurry of about 20% solids to about 70° C. and immediately cooling the solution to room temperature. This is given as illustrative since greater concentrations, higher temperatures and longer times can be used with the understanding that as one is increased, the other is decreased as is well known to one skilled in the art.

The denatured whey protein concentrate is generally dried prior to use. Any drying means can be used though it is preferred to avoid the use of high heat driers such as drum driers. A spray dried product is most preferred.

The food grade emulsifier for use in the present invention includes any emulsifier which is food grade and compatible with whey protein and flour. Emulsifiers of this type are well known. Typical of such emulsifiers are the mono and diglyceride fatty acid esters. Illustrative of these emulsifiers are the monoglycerides of hydrogenated lard, available as Myverol 1800 from Distillers Products, Inc. and a bread emulsifier of mono and diglycerides available as Durem 287 E from Glidden-Durkee Division, SCM Corporation. Other emulsifiers can be found in Food Chemicals Codex, 2nd Edition, National Academy of Science, Washington, D.C., 1972 and the supplements thereto under "Emulsifiers: Whipped, and Foaming Agents", page 103.

The protein enrichment compositions for pasta of the present invention comprise from about 90% to about 99% whey protein concentrate (denatured) and from about 10% to about 1% by weight food grade emulsifier. While the food grade emulsifers are dispersible in the denatured protein concentrate, it is preferred to admix the emulsifier with the undenatured whey protein concentrate prior to heating. During the denaturation heating step, the emulsifier is liquefied by the heat and is more thoroughly mixed with the whey protein concentrate. Less preferably, the denatured whey protein concentrate and emulsifier can be blended separately with the flour to prepare a flour mix for use in the making of the pasta.

The high protein enrichment composition for the pasta comprises from about 90% to about 99% denatured whey protein concentrate and, correspondingly, from about 10% to about 1% of a food grade emulsifier. Preferably, the whey protein concentrate is present in an amount ranging from about 94% to about 98%. Correspondingly, the food grade emulsifier is present in an amount within the range of from about 6% to about 2% by weight. More preferably, the emulsifier is present in an amount of from about 3% to about 5%, the corresponding whey protein concentrate being from about 97% to about 95%.

The high protein enriched pasta comprises from about 80% to about 95% flour, preferably semolina. Semolina is a commercially available product obtained as the coarse fraction of durum or other hard wheat. Semolina generally contains from about 12% to about 16% protein with a normal moisture content of about 13%. While semolina is preferred, any flour normally used in making pasta can be used.

The whey protein concentrate comprises from about 5 to about 20% of the pasta, of which from 1% to about 10% of the protein concentrate is emulsifier. Based on the total weight of the pasta, the whey protein concentrate comprises from about 3% to about 19.95%. The emulsifier comprises from about 0.05% to about 2.0% by weight based on the total weight of the pasta.

Other protein sources can also be used in the compositions of the present invention. For instance, soy protein isolate can be used in an amount ranging from 0 to about 8%. Commercially available soy protein isolates generally contain about 90% soy protein.

Soy protein concentrate may be used interchangeably with soy protein isolate, with this material containing only about 70% of soy protein. The term "soy protein isolate" is used herein in a comprehensive sense and is intended to cover soy protein concentrate containing soy protein in quantities as low as about 70%.

If desired, flavoring or coloring agents can be added.

The pasta is preferably prepared by thoroughly blending all dry ingredients to achieve a uniform mixture. Water is then added to make the dough. Any amount of water can be used which is needed to form the dough. It has been found that about 11.3 kilograms (25 pounds) of water can be used for 45.4 kilograms (100 pounds) of the dry blended flour mixture. The dough can then be extruded into the normal pasta shapes and dried.

The invention is more fully illustrated in the examples which follow.

EXAMPLES 1–8

Protein enrichment compositions for pasta are prepared by dispersing a food grade emulsifier in a 20% slurry of whey protein concentrate which is sold under the trade designation ENPRO®50, available from Stauffer Chemical Company, Westport, Connecticut, in the amounts given in Table I below. The whey protein concentrate/emulsifier blend is then heated to denature the protein. The slurry of protein is heated to a temperature of about 74° C.–77° C. (165°–170° F.), with constant agitation to insure uniform heating. When the desired temperature level is reached, heating is discontinued. The slurry is cooled to room temperature in a cold water bath. The slurry is dried to recover the product.

The composition of the products is set forth in Table I below:

TABLE I

| Example | 1 | 2 | 3 | 4 | 5 | 6 | 7 | 8 |
|---|---|---|---|---|---|---|---|---|
| Whey Protein Concentrate[1] | | | | | | | | |
| From Cottage Whey | 97% | 95% | 97% | 95% | — | — | — | — |
| From Blend Cottage and Cheddar Whey | — | — | — | — | 97% | 95% | 97% | 95% |
| Emulsifier | | | | | | | | |
| Myverol 1800[2] | 3% | 5% | | | 3% | 5% | | |
| Durem 287 E[3] | | | 3% | 5% | | | 3% | 5% |

[1] ENRPRO®50, Stauffer Chemical Company
[2] Monoglycerides from hydrogenated lard purified by molecular distillation (Distilled Products, Inc.).
[3] Bread emulsifier, mono and diglycerides emulsifier powder, 55% minimum monoglycerides (Glidden-Durkee Div., SCM Corp.)

EXAMPLES 9–20

High protein pasta is prepared using the compositions of Examples 1 and 2 in the formulations given in Table II below.

Each formulation is dry blended until homogeneous. A dough is prepared containing 11.3 kilograms (25 pounds) of water per 45.4 kilograms (100 pounds) of the formulation. The dough is placed in a conventional extruder and a spaghetti product is formed. The extruded product is dried at 4–6 hours at 38° C. (100° F.). Pasta formed from fomulations 9 and 10 in accordance with the invention does not crack or craze upon drying in four to six hours. Similar results are obtained using the formulation of Examples 12, 13, 15, 16, 18 and 19 in preparing pasta. Pasta prepared from formulations without emulsifiers shows evidence of cracking or crazing when dried in the same four to six hours. No problems are encountered if the pasta of Examples 11, 14, 17 and 20 are dried for a long period of time, e.g., 34 hours, Example 1, U.S. Pat. No. 3,949,101.

TABLE II

| Formulation - Example | 9 | 10 | 11 | 12 | 13 | 14 | 15 | 16 | 17 | 18 | 19 | 20 |
|---|---|---|---|---|---|---|---|---|---|---|---|---|
| Semolina | 88% | 88% | 88% | 84% | 84% | 84% | 95% | 95% | 95% | 83.5% | 83.5% | 83.5% |
| Whey Solids[1] | (12%) | (12%) | (12%) | (16%) | (16%) | (16%) (5%) | (5%) | (5%) | (11.5%) | (11.5%) | (11.5%) | |
| Product of Example | 1 | 2 | — | 1 | 2 | — | 1 | 2 | — | 1 | 2 | — |
| Denatured[3] | 11.64% | 11.4% | — | 15.52% | 15.2% | — | 4.85% | 4.75% | — | 11.15% | 10.92% | — |
| Undenatured[1] | — | — | 12% | — | — | 16% | — | — | 5% | — | — | 11.5% |
| Emulsifier[3] | 0.36% | 0.6% | — | 0.48% | 0.8% | — | 0.15% | 0.25% | — | 0.35% | 0.58% | — |
| Percent[4] | 3% | 5% | 0% | 3% | 5% | 0% | 3% | 5% | 0% | 3% | 5% | 0% |
| Soy Protein Isolate (90% soy protein) | — | — | — | — | — | — | — | — | — | 5% | 5% | 5% |

[1] See Table I
[3] See Table I
[4] By weight based on the total weight of the whey solids concentrate and the emulsifier
[5] Prepared by process described in Example 1, at least 60% denatured.

The present invention is more fully described in the claims which follow.

What is claimed is:

1. A high protein pasta which will not craze upon drying and storage consisting essentially of from about 80% to about 95% flour, from about 0 to about 8% soy protein isolate and from about 5 to about 20% of a whey protein concentrate/emulsifier composition consisting essentially of:
   a. from about 90% to about 99% of a whey protein concentrate wherein at least 60% of the protein is denatured and,
   b. from about 10% of about 1% food grade emulsifier.

2. The pasta as recited in claim 1 wherein said whey protein concentrate contains from about 40% to about 60% by weight whey protein.

3. The pasta as recited in claim 1 wherein said pasta consists essentially of a blend of from about 82% to about 90% flour and from about 10 to about 18% of the whey protein/emulsifier product.

4. The pasta as recited in claim 1 wherein said emulsifier is a food grade mono and diglyceride fatty acid ester.

5. The pasta as recited in claim 1 wherein said whey protein concentrate is present in an amount ranging from about 94% to about 98%, and said food grade emulsifier is present within the range of from about 6% to about 2% by weight.

6. The pasta as recited in claim 1 wherein said flour is semolina.

7. The pasta as recited in claim 1 wherein said concentrate is derived from 100% cottage cheese whey.

8. The pasta as recited in claim 1 wherein said whey protein concentrate is derived from 100% cottage cheese whey.

9. The high protein pasta as recited in claim 1 wherein at least 70% of the whey protein is denatured.

10. The high protein pasta as recited in claim 1 wherein said whey protein concentrate is prepared by the ultrafiltration of whey.

11. A method for preparing a whey protein concentrate emulsifier blend wherein at least 60% of the whey protein is denatured comprising:
   a. Blending a food grade emulsifier with an undenatured whey protein concentrate in water,
   b. Heating the aqueous blend to a temperature above 60° C. and below 99° C. for a period of time sufficient to substantially denature at least 60% of the whey protein but insufficient to form a curd,
   c. cooling the aqueous blend, and
   d. drying said aqueous blend.

12. A high protein pasta which is resistant to crazing on drying consisting essentially of from about 80% to about 95% flour, from about 0% to about 8% soy protein isolate, from about 19.95% to about 3% denatured whey protein concentrate wherein at least 60% of the protein is denatured and from about 0.05% to about 2% of a food grade emulsifier, the total of said protein concentrate and said emulsifier being within the range of from about 5% to about 20% by weight.

13. A method for preparing high protein pasta which is resistant to crazing upon drying which comprises:
   a. blending a food grade emulsifier with an undenatured whey protein concentrate in water;
   b. heating said blend to a temperature above 60° C. and below 99° C. for a period of time sufficient to substantially denature at least 60% of the whey protein but insufficient to form a curd;
   c. cooling and drying the blend;
   d. mixing from about 5% to about 20% by weight of said blend with from about 80% to about 95% flour with the mixing being continued until the mixture becomes uniform;
   e. thereafter adding water to said mixture in an amount of about 11.3 kilograms per 45.4 kilograms of the mixture; and f. extruding said mixture to form said high protein pasta.

* * * * *

UNITED STATES PATENT AND TRADEMARK OFFICE
CERTIFICATE OF CORRECTION

PATENT NO. : 4,120,989
DATED : October 17, 1978
INVENTOR(S) : Donald A. Grindstaff and John R. Eterno It is certified that error appears in the above-identified patent and that said Letters Patent are hereby corrected as shown below:

Column 1, line 39, delete "avocated" and insert -- advocated --.

Column 5, Table II, third line delete the phrase " (5%) ".

Column 5, line 30, delete "of" and insert -- to --.

Signed and Sealed this

Nineteenth Day of June 1979

[SEAL]

Attest:

RUTH C. MASON
Attesting Officer

DONALD W. BANNER
Commissioner of Patents and Trademarks